(12) United States Patent
Albright et al.

(10) Patent No.: US 12,299,261 B1
(45) Date of Patent: May 13, 2025

(54) COMPUTER-IMPLEMENTED SYSTEMS AND METHODS FOR AUTOMATED RESOLUTION AND DISPOSITION OF DISCREPANCIES ASSOCIATED WITH DIGITAL ARTIFACTS WITH PHYSICAL COMPONENT DATA USING A GRAPHICAL USER INTERFACE

(71) Applicant: Sub-Assist, LLC, Greenwood Village, CO (US)

(72) Inventors: John Albright, Greenwood Village, CO (US); Thomas Williams Woodward, Minneapolis, MI (US)

(73) Assignee: Sub-Assist, LLC., Greenwood Village, CO (US)

( * ) Notice: Subject to any disclaimer, the term of this patent is extended or adjusted under 35 U.S.C. 154(b) by 0 days.

(21) Appl. No.: 18/899,583

(22) Filed: Sep. 27, 2024

Related U.S. Application Data

(60) Provisional application No. 63/675,040, filed on Jul. 24, 2024.

(51) Int. Cl.
*G06F 3/0484* (2022.01)
*G06F 16/23* (2019.01)
*G06F 16/27* (2019.01)

(52) U.S. Cl.
CPC ........ *G06F 3/0484* (2013.01); *G06F 16/2365* (2019.01); *G06F 16/27* (2019.01)

(58) Field of Classification Search
CPC ...... G06F 16/27; G06F 16/273; G06F 16/275; G06F 16/278; G06F 3/0484; G06F 3/04886; G06F 2203/04803; G06F 16/2365; Y10S 707/99952
See application file for complete search history.

(56) References Cited

U.S. PATENT DOCUMENTS

| | | | |
|---|---|---|---|
| 9,229,919 B1* | 1/2016 | Krappe | G06F 40/197 |
| 11,886,403 B1* | 1/2024 | Serena | G06F 16/2365 |
| 2017/0039553 A1* | 2/2017 | Ghatage | G06Q 20/3563 |
| 2022/0301697 A1* | 9/2022 | Elliott | G16H 20/10 |

* cited by examiner

*Primary Examiner* — Nicholas Ulrich
(74) *Attorney, Agent, or Firm* — Padowithz Alce; Alce PLLC

(57) ABSTRACT

A system and method for resolving a data discrepancy between tokens linked to physical components may include providing, within a user interface (UI) container of a graphical user interface (GUI), a first UI element arranged along a first column of the UI container and based on a first token, where the first token is pulled from a digital artifact via text extraction; providing, within the UI container, a second UI element arranged along a second column of the UI container and based on a second token, where the second token is pulled from a set of tokens within a persistently accessible data structure; providing, within the UI container, a third UI element indicating a data discrepancy between the first token and the second token; and providing, within the second UI container, a set of UI control elements configured to receive inputs for resolving the data discrepancy.

16 Claims, 7 Drawing Sheets

- Dashboard
- Builders
- Projects
- Jobs  335
- Packs  330
- Supply Info.
- Legal Documents
- Procurement
- Subscribers
- Attribute Data
- Requests  305

← All Attribute Data
Subscriber Attribute Data

(ORIGINAL) (OPEN)

Details
Name: Subscriber Attribute Data
Subscriber: Subscriber ID
Comments:

Start Date: 03/01/2024
Effective Date: 03/01/2024
Expiration Date:

Attachments

Search Line Items 🔍 [Reset]

| Product 310 | Unit of Measure 320 | Unit Attribute 315 |
|---|---|---|
| 1/2FLGTAPCS | | 0.000  325 |
| 1/2FLGTAPSS | | 0.000 |
| 1/2VICTAP | | 0.000 |
| 1FLGTAPCS | | 0.000 |
| 1FLGTAPSS | | 0.000 |
| 1VICTAP | | 0.000 |

FIGURE 4

| | Number | ☒ Subscriber | Attribute Data | Received | Order | Accepted | ☒ Status | ... |
|---|---|---|---|---|---|---|---|---|
| ☐ | 8857782 | Subscriber ID | Subscriber Attribute Data | 07/11/2024 | 06/28/2024 | | READY FOR REVIEW | ... |
| ☐ | 8863799 | Subscriber ID | Subscriber Attribute Data | 07/11/2024 | 06/28/2024 | | ITEM ERROR | ... |
| ☐ | 8947838-1 | Subscriber ID | Subscriber Attribute Data | 07/16/2024 | 06/28/2024 | | READY FOR REVIEW | ... |
| ☐ | 8948176-1 | Subscriber ID | Subscriber Attribute Data | 07/16/2024 | 06/28/2024 | | READY FOR REVIEW | ... |
| ☐ | 8990773-1 | Subscriber ID | Subscriber Attribute Data | 07/16/2024 | 06/28/2024 | ✓ | ACCEPTED | ... |

Sidebar: Dashboard, Builders, Projects 410, Jobs, Packs, Supply Info, Legal Documents, Procurement, Subscribers, Attribute Data, Requests 405

Toolbar: Search Requests 415, Subscriber 417, More 420, Reset 425, + New 475, Import Errors, Sort 435

Labels: 440, 445, 455, 460, 430, 465-a, 465-b, 465-c, 470, Need Help?

COMPUTER-IMPLEMENTED SYSTEMS AND METHODS FOR AUTOMATED RESOLUTION AND DISPOSITION OF DISCREPANCIES ASSOCIATED WITH DIGITAL ARTIFACTS WITH PHYSICAL COMPONENT DATA USING A GRAPHICAL USER INTERFACE

CROSS-REFERENCE TO RELATED APPLICATIONS

This application claims the benefit of U.S. Provisional Application No. 63/675,040, filed 24 Jul. 2024, which is incorporated herein in its entirety by this reference.

TECHNICAL FIELD

This invention relates generally to a graphic user interface (GUI) and more specifically, to a new and useful system and method generating a GUI associated with a data processing platform that is configured to facilitate an automated data resolution and data disposition for discrepancies between digital artifacts using a graphical user interface in at least the automated data processing field.

BACKGROUND

In modern industries, efficient automated data processing and reconciliation are critical for operational success. Organizations routinely manage and process large volumes of digital data associated with a handling of physical components. These digital artifacts contain essential information such as part numbers, quantities, and other attributes that need to be accurately reconciled against internal digital records or computer databases to maintain data integrity and ensure correct data processing.

A common technical challenge arises when discrepancies occur between the data extracted from digital artifacts and the corresponding data stored in internal computing systems. Such discrepancies may be due to variations in data formats, errors in data entry, differences in data sources, or data discrepancies in the synchronization of information across various databases. These discrepancies can lead to substantial inefficiencies, such as incorrect data processing, delayed processing, data log jams, and undue blocking of data processing requests, thereby affecting overall operational performance of a data processing computing system.

There is a need for a technical solution that can automate the process of reconciling digital artifacts with physical component data across diverse formats, while providing an interactive and dynamic and interactive graphical user interface (GUI) that enhances user engagement and automated decision-making within computer systems. Such a solution would improve the accuracy and efficiency of data reconciliation processes by leveraging advanced data processing techniques, such as machine learning models, natural language processing, and data normalization algorithms, to automatically identify and resolve discrepancies in real time.

Embodiments of the present application address these technical challenges by providing computer-implemented systems and methods that enable automated reconciliation of digital artifacts with physical component data using a GUI. The invention incorporates specialized modules and algorithms for data ingestion, conversion, comparison, and resolution, ensuring a robust, scalable, and efficient solution for managing large volumes of digital and physical component data in a dynamic and interactive manner.

BRIEF SUMMARY OF THE INVENTION(S)

In some embodiments, a computer-program product embodied in a non-transitory machine-readable storage medium may store computer instructions that, when executed by one or more processors, perform operations that provide a graphical user interface (GUI) comprising a user interface (UI) container, the UI container including: a first UI element arranged along a first column of the UI container based on a detection of a first token of a digital artifact, and wherein the first token indicates first identifier data associated with a first physical component and a first unit attribute associated with the first physical component; a second UI element arranged along a second column of the UI container based on an identification of a second token of a plurality of distinct tokens within a persistently accessible data structure, where the second token indicates second identifier data associated with a second physical component and a second unit attribute associated with the second physical component; a third UI element indicating a data discrepancy between the first token and the second token, where the data discrepancy is automatically computed based on identifying a first nonconformity of the first identifier to the second identifier, or identifying a second nonconformity of the first unit attribute to the second unit attribute; and a set of UI control elements configured to receive one or more inputs for resolving the data discrepancy, where resolving the data discrepancy comprises receiving inputs indicating whether a portion of the digital artifact corresponding to the first token is invalid.

In some embodiments, the GUI further comprises a second UI container, and where the second UI container includes a first UI element arranged along a first column of the second UI container and indicating the data discrepancy between the first and the second token; and a UI control element arranged along a second column of the second UI container and configured to trigger generation of the UI container upon receiving an input.

In some embodiments, the second UI container further includes a second UI element arranged along a third column of the second UI container and indicating whether the set of UI control elements of the UI container have received an input for resolving the data discrepancy.

In some embodiments, the second UI element of the second UI indicates that the set of UI control elements of the UI container have received the input for resolving the data discrepancy and further indicates which of the set of UI control elements received the input.

In some embodiments, the UI container further includes a second UI element arranged along a third column of the second UI container and indicating the first physical component identifier, first physical component unit attribute, or both.

In some embodiments, the GUI further comprises a second UI container, and where the second UI container includes: a UI control element configured to obtain the digital artifact upon receiving an input, where the UI control element is further configured to automatically initiate generation of the first token based on obtaining the digital artifact.

In some embodiments, the GUI further comprises a second UI container, where the second UI container includes a UI control element configured to obtain a second digital artifact upon receiving an input, where the UI control element is further configured to automatically initiate generation of the persistently accessed data structure based on obtaining the second digital artifact.

In some embodiments, within the UI container, the third UI element indicating the data discrepancy is interposed between the first column of the UI container and the second column of the UI container or the third UI element indicating the data discrepancy is arranged along a row in-line with and adjacent to either the first column of the UI container or the second column of the UI container.

In some embodiments, the set of UI control elements includes a first UI control element configured to indicate that the portion of the digital artifact corresponding to the first token is valid, a second UI control element configured to indicate that the portion of the digital artifact corresponding to the first token is invalid, and a third UI control element configured to indicate that the portion of the digital artifact corresponding to the first token has an undefined status.

In some embodiments, a GUI may comprise a UI container, the UI container comprising: a first UI element arranged along a first column of the UI container based on a detection of a first token of a digital artifact, and where the first token indicates first identifier data associated with a first physical component and a first unit attribute associated with the first physical component; a second UI element arranged along a second column of the UI container based on an identification of a second token of a plurality of distinct tokens within a persistently accessible data structure, where the second token indicates second identifier data associated with a second physical component and a second unit attribute associated with the second physical component; a third UI element indicating a data discrepancy between the first token and the second token, where the data discrepancy is automatically computed based on identifying a first nonconformity of the first identifier to the second identifier, or identifying a second nonconformity of the first unit attribute to the second unit attribute; and a set of UI control elements configured to receive one or more inputs for resolving the data discrepancy, where resolving the data discrepancy comprises receiving inputs indicating whether a portion of the digital artifact corresponding to the first token is invalid.

In some embodiments, the GUI further comprises a second UI container, and where the second UI container includes: a first UI element arranged along a first column of the second UI container and indicating the data discrepancy between the first and the second token and a UI control element arranged along a second column of the second UI container and configured to trigger generation of the UI container upon receiving an input.

In some embodiments, the second UI container further includes: a second UI element arranged along a third column of the second UI container and indicating whether the set of UI control elements of the UI container have received an input for resolving the data discrepancy.

In some embodiments, a computer-implemented method for implementing a GUI comprising a UI container, the computer-implemented method comprising: providing, within the UI container, a first UI element arranged along a first column of the UI container based on detection a first token, where the first token indicates first identifier data associated with a first physical component and a first unit attribute associated with the first physical component; providing, within the UI container, a second UI element arranged along a second column of the UI container based on a detection of a second token of a plurality of distinct tokens within a persistently accessible data structure, where the second token indicates second identifier data associated with a second physical component and a second unit attribute associated with the second physical component; providing, within the UI container, a third UI element indicating a data discrepancy between the first token and the second token, where the data discrepancy is automatically computed based on: identifying a first nonconformity of the first identifier to the second identifier, or identifying a second nonconformity of the first unit attribute to the second unit attribute; and providing, within the second UI container, a set of UI control elements configured to receive one or more inputs for resolving the data discrepancy, where resolving the data discrepancy comprises receiving inputs indicating whether a portion of the digital artifact corresponding to the first token is invalid.

In some embodiments, the computer-implemented method may further comprise in response to the third UI element indicating the data discrepancy between the first token and the second token, receiving an input via the interactive GUI that adapts either the first identifier or the second identifier; and automatically changing a state of the third UI element from indicating the data discrepancy to indicating a data validity between the first token and the second token.

In some embodiments, the computer-implemented method may further comprise automatically processing a request comprising the digital artifact to a completed state based on the change of the state of the third UI element thereby successfully disposing the request.

In some embodiments, providing the third UI element comprises: storing, in memory associated with the GUI, information about the data discrepancy between the first token and the second token; generating a digital signal based at least in part on the information about the data discrepancy stored in memory; and converting the digital signal into the third UI element.

In some embodiments, providing the first UI element comprises: storing, in memory associated with the GUI, information about the first token; generating a digital signal based at least in part on the information about the first token; and converting the digital signal into the first UI element.

In some embodiments, providing the second UI element comprises: storing, in memory associated with the GUI, information about the second token; generating a digital signal based at least in part on the information about the second token; and converting the digital signal into the second UI element.

In some embodiments, the computer-implemented method may further comprise receiving, via the set of UI control elements, an indication of whether the portion of the digital artifact corresponding to the first token is invalid; storing, in memory associated with the GUI, information about the indication; and transmitting, over a computer network, a message based on the stored information about the indication.

BRIEF DESCRIPTION OF THE FIGURES

FIGS. 3-7 illustrate UI containers 300-700 in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

One of the advantages associated with the techniques described herein is that they may employ automated discrepancy detection, which may enable discrepancies to be more easily resolved between physical component data extracted from digital artifacts and physical component data stored in a persistently accessible data structure. The system may automatically monitor for discrepancies between data identifiers or unit attributes and may highlight these mismatches via a graphical user interface (GUI). The automatic identification of data discrepancies may improve the accuracy of component tracking and may enable quicker resolution of errors as compared to manual techniques (e.g., manual comparison of data identifiers and unit attributes), which may be computationally inefficient and prone to errors.

Additionally, the techniques described herein may enable a user to directly modify data stored at and communicated by the system hosting the GUI. This capability to interactively resolve data discrepancies may improve the efficiency of data management and may reduce computational burden on external systems communicating with the system hosting the GUI. By enabling users to address issues utilizing the GUI, complex post-processing and resolution workflows may be avoided.

Additionally, the techniques described herein may be capable of being utilized in large-scale data environments, including environments in which thousands of digital artifacts are processed daily and discrepancies are resolved in real time. Automating at least portions of the discrepancy resolution process and providing a GUI for validation may enable the system to scale efficiently without degradation in performance. Such techniques may enable the system to perform accurate and timely data resolution while maintaining operational efficiency.

1.00 Digital Procurement and Resolution Platform

Figure 1:
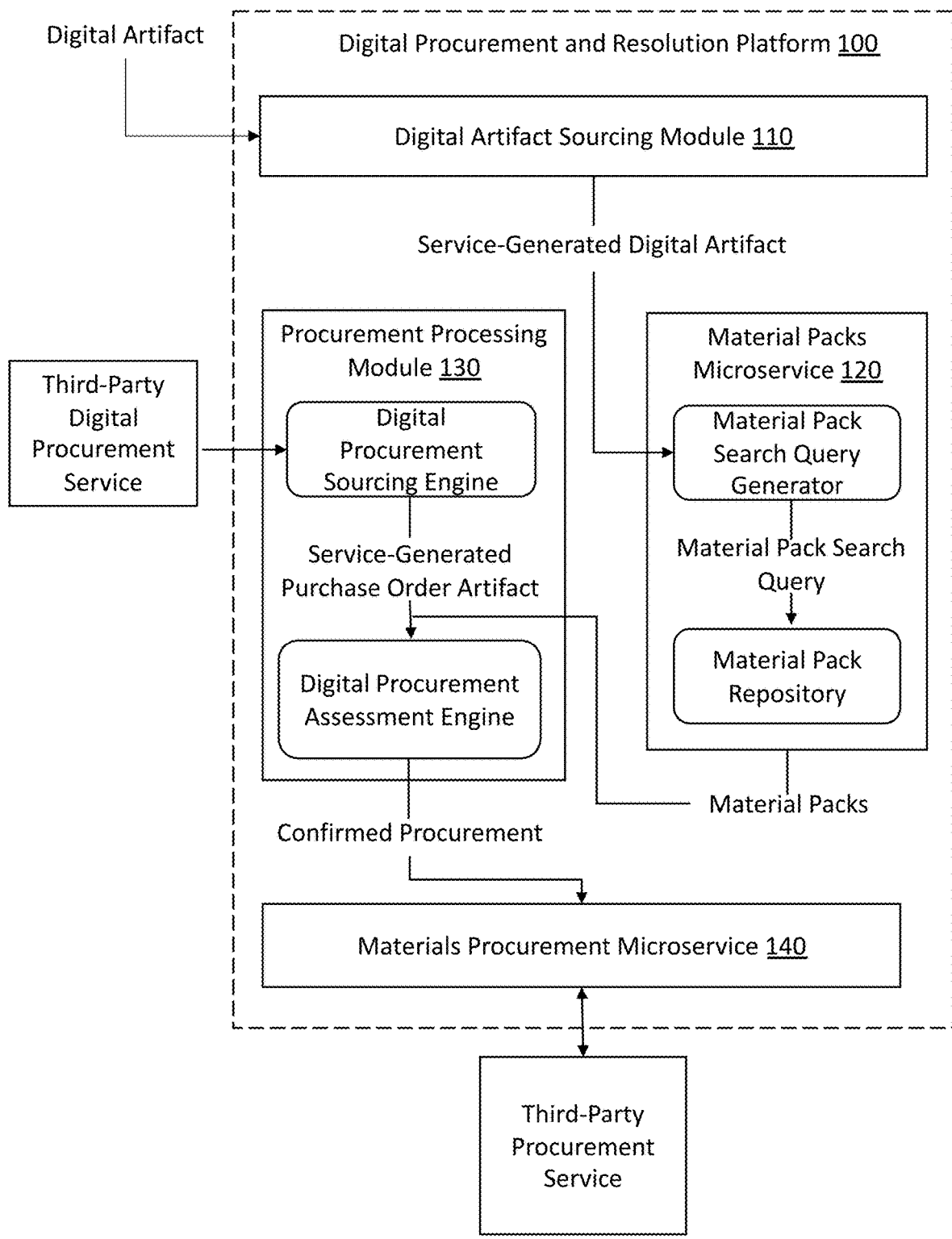
FIG. 1 illustrates a schematic representation of a system 100 in accordance with one or more embodiments of the present application.

As shown in FIG. 1, a computerized system for automated digital procurement and digital artifact resolution platform 100 may include a digital artifact sourcing module 110, a material packs microservice 120, a procurement command processing module 130, and a materials procurement microservice 140.

1.10 Digital Artifact Sourcing Module

The digital artifact sourcing module 110 may function to source or obtain one or more digital artifacts associated with a subscriber. In some embodiments, the digital artifact sourcing module 110 may implement one or more graphical user interfaces (GUIs), command line interfaces (CLIs), or application programming interfaces (APIs) to obtain or source the one or more digital artifacts associated with the subscriber. The one or more graphical user interfaces (GUIs), command line interfaces (CLIs), or application programming interfaces (APIs), in such embodiments, may be digitally accessible by the subscriber(s) of the system 100 and/or may enable the subscriber(s) to upload or transmit one or more target digital artifacts to the system 100.

In some embodiments, a digital artifact, as generally referred to herein, may be or relate to an electronic or digitized agreement artifact between the subscriber and one or more external entities for performing one or more construction-related tasks (e.g., real-world tasks). For instance, in a non-limiting example, the one or more digital artifacts sourced by the digital artifact sourcing module 110 may each relate to a distinct electronic or digitized agreement that engages the subscriber to perform one or more construction-related tasks for an external entity.

1.20 Material Packs Microservice

The material packs microservice 120 may function to derive one or more digital material packs associated with each digital artifact sourced by the digital artifact sourcing module 110. A digital material pack, as generally referred to herein, may relate or correspond to a distinct construction-related task and, optionally, may comprise a collection of one or more (e.g., interdependent) materials for performing the distinct construction-related task or project. Thus, in some embodiments, deriving the one or more digital material packs associated with a subject digital artifact may enable the system 100 to automatically recognize or discern the one or more materials required for fulfilling the one or more constructed-related tasks defined in the subject digital artifact.

As described in more detail herein, in one implementation, to derive the one or more digital material packs associated with a target digital artifact, the material packs microservice 120 may function to construct one or more digital material pack search queries based on the target digital artifact and, in turn, execute the one or more digital material pack search queries against a material pack data repository comprising one or more digital material packs.

In one example of such implementations, the material packs microservice 120 may construct the one or more digital material pack search queries based on outputs of one or more ensembles of machine learning models implemented by the system 100. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.30 Digital Procurement Processing Module

The procurement processing module 130 may function to source and process one or more digital procurements issued to the subscriber by one or more external entities. In some embodiments, as shown by way of example in FIG. 3, the procurement processing module 130 may source the one or more digital procurements by operatively communicating with one or more procurement systems associated with the one or more external entities.

Additionally, in some embodiments, the procurement processing module 130 may function to reconcile each of the one or more digital procurements issued to the subscriber with a trade artifact. In one implementation of such embodiments, to reconcile a subject digital procurement, the procurement processing module 130 may function to search for a digital artifact in the system 100 matching the subject digital procurement and, in turn, assess the physical component data (e.g., line-item data) included in the subject digital procurement against the physical component data included in the digital artifact. The procurement process module 130, in some embodiments, may successfully reconcile the subject digital procurement if no differences or less than a threshold number of differences between the physical component data of the subject digital procurement and the physical component data of the digital artifact were identified during the assessment.

Conversely, in some embodiments, the procurement processing module 130 may generate a resolution error for the subject digital procurement if one or more differences between the physical component data of the subject digital procurement and the physical component data of the digital artifact were identified during the assessment. Additionally, or alternatively, in some embodiments, the procurement processing module 130 may generate a resolution error for the subject digital procurement if a digital artifact matching the subject digital procurement was unable to be identified by the system 100.

1.40 Procurement Microservice

In one or more embodiments, the material packs microservice 140 may be implemented as a specially configured computer server or a distributed computing node within a digital procurement and resolution platform. The material packs microservice 140 is preferably encoded and/or programmed with a set of machine-readable instructions and operates in a cloud-based or on-premises environment, executing on one or more processors connected to memory storage devices. The material packs microservice 140 may be specially designed to autonomously manage the creation, retrieval, and processing of digital material packs data associated with digital artifacts, such as procurement documents or related digital artifacts.

The materials procurement microservice 140 may function to generate a digital order for each of the one or more digital artifacts sourced by the digital artifact sourcing module 110. In some embodiments, the materials procurement microservice 140 may generate a digital material order for each of the one or more digital artifacts that are associated with a successfully reconciled digital procurement and, optionally, may forgo generating a digital material order for each of the one or more digital artifacts that are associated with a reconciliation error.

In one implementation, constructing the digital material order may include defining an application programming interface (API) request. In such an implementation, the materials procurement microservice 140 may function to define a target endpoint for the application programming interface request (e.g., an HTTP or HTTPS endpoint) and an order payload for the application programming interface request. It shall be noted that the target endpoint, as generally referred to herein, may relate to a subscriber-defined or system-defined web destination to which the order payload may be transmitted upon the materials procurement microservice 140 executing the application programming interface request. For instance, in a non-limiting example, the target endpoint may relate to a web destination associated with a target material supplier. Furthermore, it shall also be noted that, in some embodiments, the order payload may be constructed in a manner that satisfies the format requirements or specifications of the target endpoint.

In some embodiments, the materials procurement microservice 140 may build or construct the order payload based on the one or more material packs determined, via the material packs microservice 120, to be associated with the target digital artifact. For instance, in a non-limiting example, the materials procurement microservice 140 may function to identify the one or more materials underpinning the one or more material packs that are determined to be associated with the target digital artifact and, in turn, deposit the one or more materials into the order payload in a format required by the target endpoint (e.g., {digital materials: [material_1, material_2, material 3]}).

In some examples, digital procurement and resolution platform 100 may resolve a data discrepancy between tokens linked to physical components, as described herein. For instance, digital procurement and resolution platform 100 may perform one or more steps as described with reference to FIG. 2.

Figure 2:
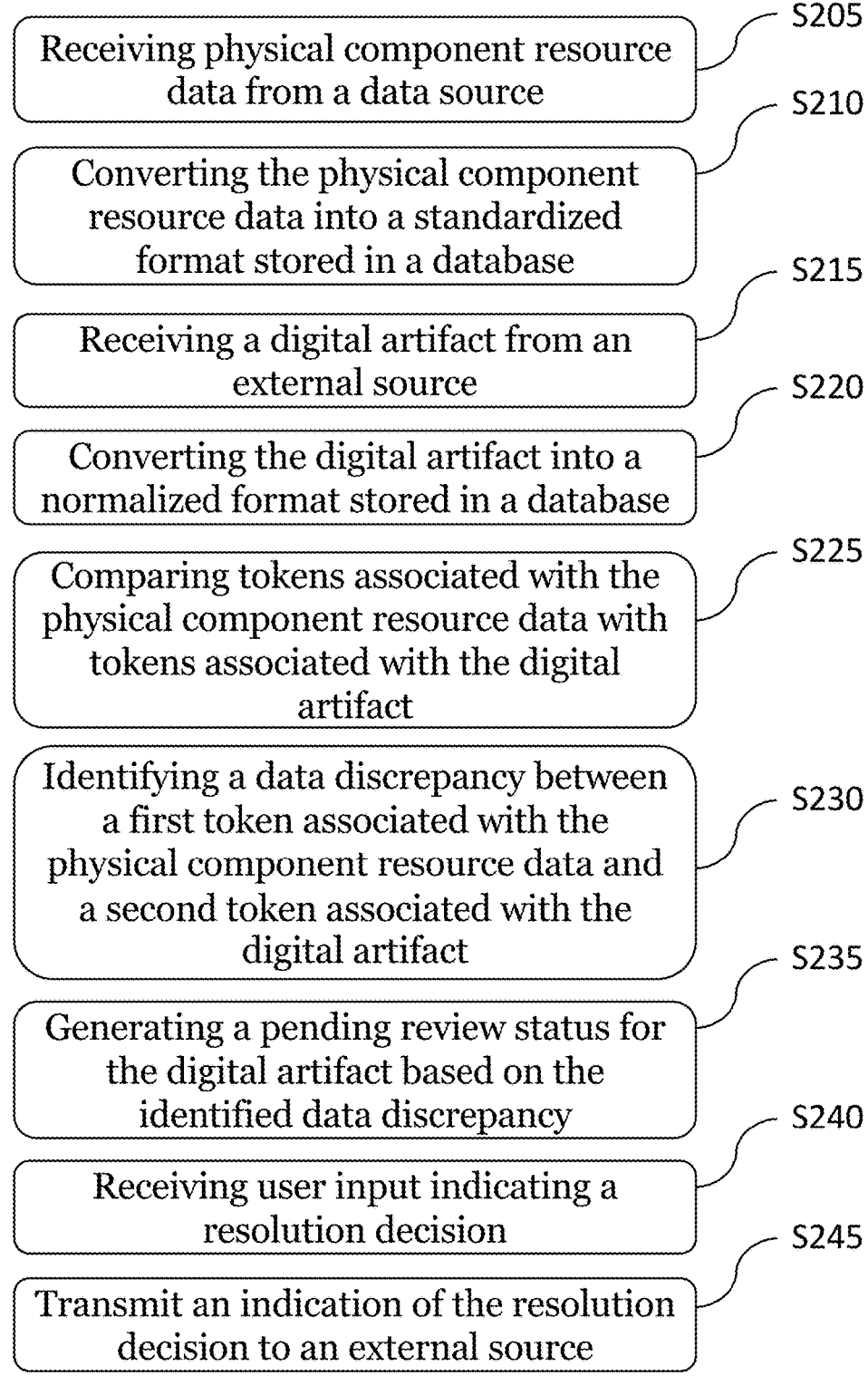
FIG. 2 illustrates an example method 200 in accordance with one or more embodiments of the present application.

2.00 Method for Resolving a Data Discrepancy Between Digital Tokens Linked to Physical Components As shown in FIG. 2, a method for resolving a data discrepancy between tokens linked to physical components (e.g., physical items) may include receiving physical component resource data from a data source (S205); converting the physical component resource data into a standardized format stored in a database, where the physical component resource data indicates a respective unit attribute in a form of a quantity or value for each physical component of a first set of physical components associated with the physical component resource data (S210); receiving a digital artifact (e.g., a request for reconciliation processing or the like) from an external source indicating a respective unit attribute quantity for each physical component of a second set of physical components associated with the digital artifact (S215); converting the digital artifact into a normalized format stored in the database (S220); comparing one or more tokens associated with the physical component resource data with one or more tokens associated with the digital artifact (S225); identifying a data discrepancy between a first token of the one or more tokens associated with the physical component resource data and a second token of the one or more tokens associated with the digital artifact (S230); generating a pending review status for the digital artifact based on the identified data discrepancy (S235); receiving user input to resolve the data discrepancy, where the user input indicates a resolution decision associated with the data discrepancy (S240); and in response to the resolution decision, transmitting an indication of the resolution decision to an external source (S245). It shall be appreciated that other examples contemplated within the scope of the present disclosure may involve more operations, fewer operations, different operations, or a different order of operations than as shown in FIG. 2. The method may be performed by a system or a remote data processing service (e.g., a digital procurement and resolution platform 100).

2.05 Receiving Physical Component Resource Data from a Data Source

S205, which includes receiving physical component resource data from a data source, functions to intake data essential for the subsequent resolution process. The physical component resource data may be data associated with a plurality of physical components and one or more attributes of the physical components (e.g., an identifier of the physical component, a unit attribute, a description associated with the physical component, metadata associated with the physical component). The data source may include one or more of an external database, a spreadsheet, or a direct data feed. This reception of data may be executed by a data reception module operating on a computing processor.

In some examples, S205 may include one or more pre-processing activities such as data cleansing, deduplication, and preliminary sorting to optimize the data for easier conversion and normalization in subsequent steps. The pre-processing tasks may enhance the accuracy and efficiency associated with performing step S210. In some examples, the process may include validation checks such as format verification and completeness assessments to ensure data integrity before further processing.

2.10 Converting the Physical Component Resource Data into a Standardized Format

S210 may function to convert diverse data formats into a unified, structured format and may include converting the physical component resource data into a standardized format stored in a persistently accessible data structure (e.g., a database), where the physical component resource data indicates a respective unit attribute quantity for each physical component of a first set of physical components associated with the physical component resource data. This transformation may be executed by a data conversion module operating on the computing processor, which systematically reorganizes data elements from various initial formats into a standardized digital format.

This process may be subdivided into one or more steps. The one or more steps may include aligning data fields from original formats to corresponding fields in the standardized format, ensuring that all data elements are consistently represented. Additionally, or alternatively, the one or more steps may include adjusting numerical values for uniformity, such as converting measurements to a single system of units. Additionally, or alternatively, the one or more steps may include text standardization, such as converting text data to a consistent case (e.g., upper case, lower case), removing extraneous spaces or characters, and correcting common spelling errors.

In some examples, S210 may include enhancing data with additional metadata or formatting to support later processing stages. For instance, adding markers or tags that indicate a source of the data (e.g., from which data source it originated) may enable tracking of the origin of data through processing pipelines. In some examples, S210 may include a validation phase where the transformed data is checked against predefined rules to ensure integrity and completeness. This validation may check for missing values, detect anomalies in data patterns, or ensure that all entries conform to expected data types and formats.

The transformation provided by S210 may prepare data for additional steps that allow for resolution of a data discrepancy between tokens as described herein by ensuring that the data is accessible and usable across various system functions. By converting disparate data into a coherent and standardized format, S210 ensures that data is ready for accurate and efficient processing.

User interface (UI) container 300 of FIG. 3 may illustrate a non-limiting example of a system that enables reception of a physical component resource data and displaying of physical component resource data in a standardized format (e.g., as related to S205 and S210). Physical component resource data may be displayed via tab 305. Within each physical component resource data may be a column 310 of physical component identifiers, where each of the column 310 of physical component identifiers may have an associated unit attribute from the column 315 of unit attributes. For instance, physical component identifier 320 may map to physical component identifier 325. Each physical component resource data may have an associated name 335 and/or an associated entity 330 (e.g., an ID of an associated subscriber) to which it maps. In some examples, UI container 300 may be a UI container of an interactive graphical user interface (GUI). In some examples, physical component resource data may also be referred to as attribute data and attribute data associated with a particular subscriber may be referred to as subscriber attribute data.

To standardize the physical component resource data, a numerical attribute may be extracted from the data source associated with the physical component resource data and may be converted to a unit attribute. The numerical attribute may be associated with a quantity of physical components in the physical component resource data that map to a particular physical component identifier within column 310 and converting to the attribute may include dividing the numerical attribute by the quantity of physical components. Alternatively, the unit attribute may be directly extracted from the data source.

In some examples, the tab 305 may be utilized to receive a new physical component resource data (e.g., uploaded via a user interface). For instance, upon user input being applied to tab 305, a UI container may appear that may include a UI control element configured to obtain a digital artifact upon receiving an input. The UI control element may be configured to automatically initiate generation of the persistently accessible data structure in which to store the physical component resource data associated with (e.g., generated from) the digital artifact.

2.15 Receiving a Digital Artifact from an External Source

S215, which includes receiving a digital artifact from an external source indicating a respective unit attribute quantity for each physical component of a second set of physical components associated with the digital artifact, functions to intake data utilized in the subsequent resolution process. The digital artifact may be received in a structured format (e.g., via XML, JSON) or may be received in an unstructured format (e.g., images, PDFs, free-form text documents). This reception of the digital artifact may be executed by the data reception module or another module.

In some examples, S215 may include one or more preprocessing activities such as data cleansing, deduplication, and preliminary sorting to optimize the data for easier conversion and normalization in subsequent steps. The preprocessing tasks may enhance the accuracy and efficiency associated with performing step S220.

2.20 Converting the Digital Artifact into a Standardized Format

S220, which includes converting the digital artifact into a normalized format stored in the database, functions to convert diverse data formats into a unified, structured format. This transformation may be executed by the data conversion module or another module.

In some examples, an algorithm may be employed to standardize diverse elements into data entries. The algorithm may standardize textual data, which may include converting text into a consistent case, removing redundant spaces or characters, and standardizing the formatting of names and addresses. Additionally, or alternatively, the algorithm may normalize numerical values, such as adjusting numerical data to use a uniform number of decimal places and converting numerical values to a consistent unit system. Additionally, or alternatively, the algorithm may normalize dates by converting each date entry into a single format, ensuring consistency in temporal data.

In some examples, S220 may include enhancing data with additional metadata or formatting to support later processing stages. For instance, adding markers or tags that indicate a source of the data (e.g., from which external source it originated) may enable tracking of the origin of data through processing pipelines. In some examples, S210 may include a validation phase where the transformed data is checked against predefined rules to ensure integrity and completeness. This validation may check for missing values, detect anomalies in data patterns, or ensure that all entries conform to expected data types and formats.

It shall be noted that the term "normalized format" as used herein refers to a systematically structured format that is used consistently throughout a data processing system. This normalization is crucial for enabling data interoperability and efficient processing within the system.

UI container 400 of FIG. 4 may illustrate a non-limiting example of a system that enables reception of a digital artifact (which also may be referred to as a request) and displaying of information associated with the digital artifact in a standardized format (e.g., as related to S215 and S220). A repository of digital artifacts may be displayed via tab 405. The UI container 400 may display a column 410 of identifiers mapping to a particular digital artifact, a column 415 of entities linked to a particular digital artifact, a column 417 of physical component resource data linked to a particular digital artifact, a column 420 of dates indicating when a source document associated with the digital artifact was first received and/or when the digital artifact was first received, and column 425 of dates indicating when a procurement of physical components associated with the digital artifact was first requested. Each identifier of a digital artifact may be linked to a particular entry in columns 415, 417, 420, and 425. For instance, identifier 440 may map to entity 445 (e.g., an ID of a subscriber) of column 415, physical component resource data 450 of column 417, date 455 of column 420, and date 460 of column 425. In some examples, the UI container 400 may display a column 430 indicating a date 470 of when a digital artifact was accepted (e.g., when a resolution decision was made for each physical component associated with the digital artifact). In some examples, UI container 400 may be a UI container of an interactive GUI.

In some examples, the UI control element 475 may be utilized to receive a new digital artifact (e.g., uploaded via a user). For instance, tab 475 may be configured to obtain the digital artifact upon receiving user input and may, in some examples, automatically initiate generation of tokens for comparison for the digital artifact and/or automatically initiate the comparison process for the digital artifact (e.g., at step S225).

2.25 Automated Evaluation of Tokens Associated with the Physical Component Resource Data and Digital Artifact S225, which includes comparing one or more tokens associated with the physical component resource data with one or more tokens associated with the digital artifact, functions to determine if a data discrepancy or mismatch may be automatically detected between tokens of the digital artifact and tokens of the physical component resource data. Each of the one or more tokens associated with the physical component resource data may map to a respective physical component of the first set of physical components and each of the one or more tokens associated with the digital artifact may map to a respective physical component of the second set of physical components. In some examples, S225 may be performed by a resolution module operating on the computing processor.

In some examples, performing the comparison may include comparing, for each physical component of the first set of physical components, an attribute associated with the physical component to a respective attribute for each physical component of the second set of physical components. Performing the comparing may include using an exact matching algorithm, a probabilistic matching technique, or both to evaluate a degree of agreement between two tokens. Performing the comparison may include ensuring that an identifier, a unit attribute, or a quantity of two physical components is within predefined variance constraints.

In some examples, S225 may include assigning a confidence level to each assessment, quantifying the likelihood that any identified discrepancy is an error or within acceptable parameters. This scoring helps prioritize entries for further examination, focusing attention on those with the lowest confidence scores (at S240, for instance). In some examples, S225 may incorporate analytical methods, such as statistical models to identify outlier entries that deviate from typical patterns, potentially indicating errors.

Figure 6:
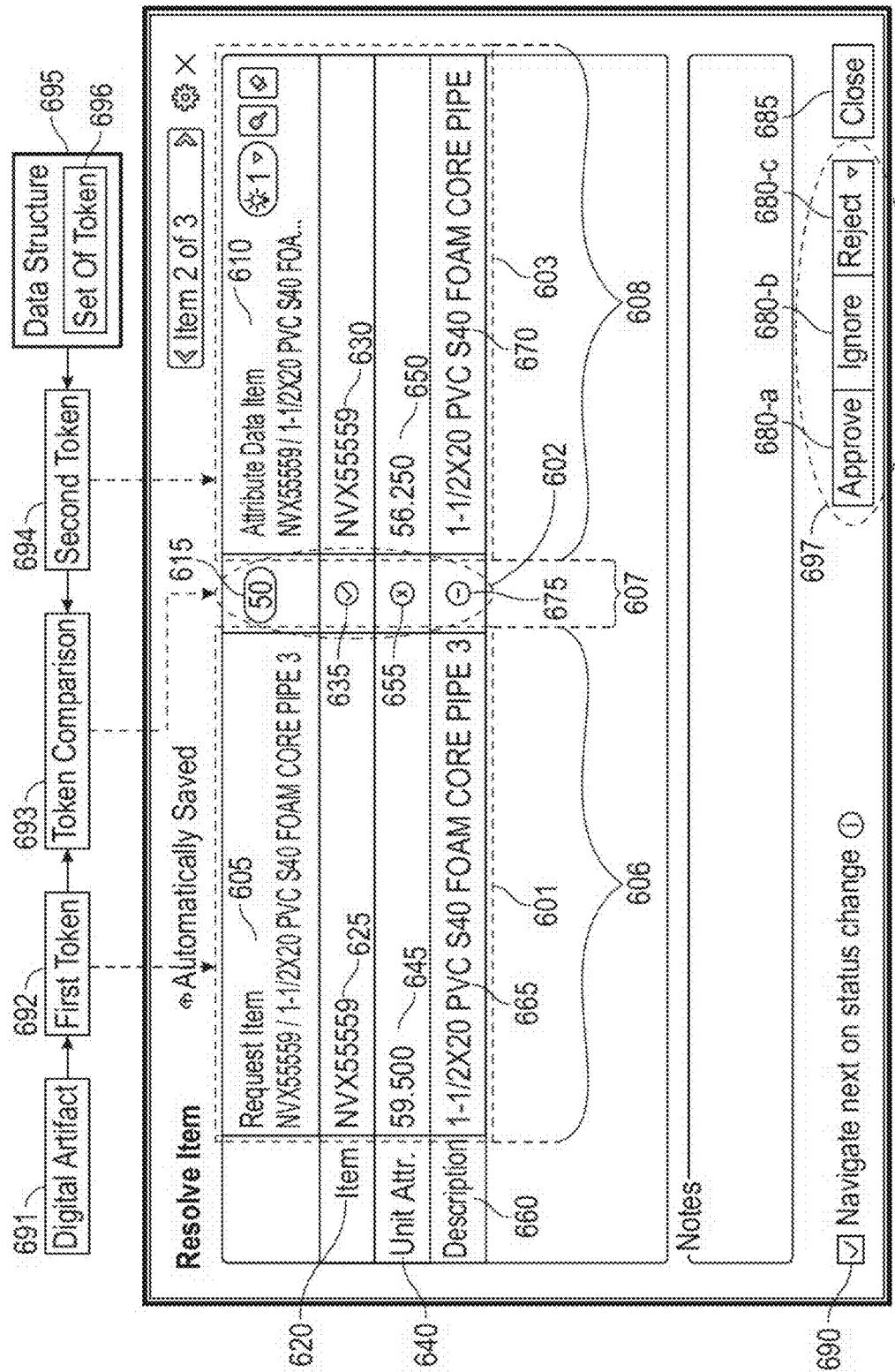

UI containers 600 and 700 may illustrate non-limiting examples of a system that enables comparison of tokens (e.g., as related to S225). For instance, as depicted in FIG. 6, a first token 692 may be pulled from a digital artifact 691

(e.g., a digital artifact as described in FIG. 4). In some examples, the first token 692 may be pulled via text extraction. The first token 692 may indicate or map to a first physical component identifier and a first physical component unit attribute. Additionally, a second token 694 may be pulled from a distinct set of tokens 696 within a data structure 695 (e.g., a persistently accessible data structure). The second token 694 may indicate or map to a second physical component identifier and a second physical component unit attribute. The first token and the second token may undergo token comparison 693.

Figure 7:
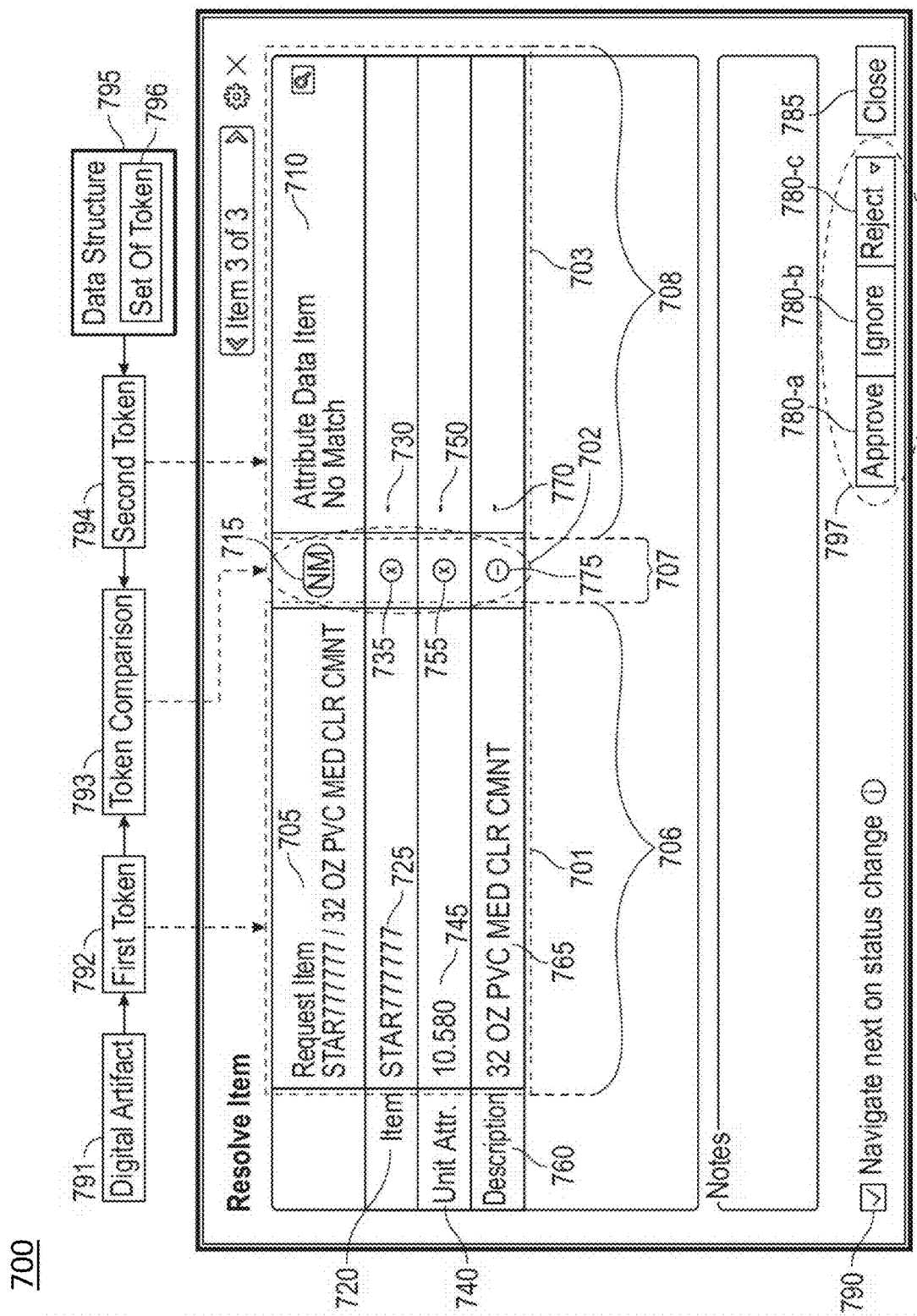

Similarly, as depicted in FIG. 7, a first token 792 may be pulled from a digital artifact 791 (e.g., a digital artifact as described in FIG. 4). In some examples, the first token 792 may be pulled via text extraction. The first token 792 may indicate or map to a first physical component identifier and a first physical component unit attribute. Additionally, a second token 794 may be pulled from a set of distinct tokens 796 within a data structure 795 (e.g., a persistently accessible data structure). The second token 794 may indicate or map to a second physical component identifier and a second physical component unit attribute. The first token and the second token may undergo token comparison 793.

2.30 Identifying a Token Discrepancy or Mismatch

S230, which includes identifying a data discrepancy between a first token of the one or more tokens associated with the physical component resource data and a second token of the one or more tokens associated with the digital artifact, functions to trigger generation of a review status if a data discrepancy occurs. The first token of the one or more tokens may map to a first physical component of the physical component resource data and the second token of the one or more tokens may map to a second physical component of the second set of physical components. Identifying the data discrepancy may include identifying that an attribute of the second physical component (e.g., a unit attribute, the description, the identifier, associated metadata) matches only partially or does not match at all with the first physical component. In some examples, S225 may be performed by the resolution module or another module.

UI containers 600 and 700 may illustrate non-limiting examples of a system that enables identification of data discrepancy. For instance, as depicted in FIG. 6, token comparison 693 may be utilized to detect a data discrepancy between first token 692 and second token 694. Similarly, as depicted in FIG. 7, token comparison 793 may be utilized to detect a data discrepancy between first token 792 and second token 794.

2.35 Generating a Review Status

S235, which includes generating a pending review status for the digital artifact based on the identified data discrepancy, functions to alert a user that a data discrepancy has occurred. In some examples, S235 may include generating a review status for each physical component associated with the digital artifact. Examples of the review status include a confirmed match review status indicating a minimal or low alert level for reviewing and a partial match or no match review status indicating a high alert level for reviewing. Once a user conducts a review of an indicated partial match or no match, the review status may be updated to indicate that the partial match or no match has been reviewed. In some examples, no review status is generated for fully matching tokens. In some examples, S235 may be performed by the resolution module or another module.

In some examples, S235 may include dynamically updating a review status as new information becomes available or as corrective actions are applied. This dynamic updating may ensure that each review status accurately reflects its current state and may facilitate efficient management of data processing workflows. In some examples, S235 may include generating alerts or notifications based on assigned statuses (e.g., if the review status indicates a partial or failed match between tokens). These alerts may enable users to take timely action.

UI container 400 may illustrate a non-limiting example of a system for displaying the review status. For instance, as depicted in FIG. 4, the UI container 400 may display a column 435 of UI elements that indicate review status, where each review status may map to a particular digital artifact. For instance, UI element 465-*a* may indicate that a data discrepancy has definitively occurred (e.g., a total data discrepancy occurred) and/or that a rejection was indicated as a resolution decision for a potential data discrepancy associated with the particular digital artifact during review. UI element 465-*b* may indicate that a review of a particular digital artifact has not occurred and/or that a potential data discrepancy between tokens is detected for the particular digital artifact. UI element 465-*c* may indicate that no data discrepancy has occurred for a particular digital artifact and/or that an approval was indicated as a resolution decision for a potential data discrepancy associated with the particular digital artifact during review. Each of the column 435 of UI elements may, in some examples, be a UI control element that links to another UI container (e.g., UI container 500 as described herein).

2.40 Receiving User Input to Resolve the Data Discrepancy

S240, which includes receiving user input to resolve the data discrepancy, where the user input indicates a resolution decision associated with the data discrepancy, functions to ensure that the data discrepancy is handled as desired by the user. Examples of the resolution decision include approval (e.g., approving the information associated with the second token as valid despite the discrepancy between the first token and the second token), rejection (e.g., rejecting the information associated with the second token as invalid due to the discrepancy), or assertion of an undefined status. In some examples, S240 may be performed by the resolution module or another module.

Setting the resolution decision may include performing an interactive review, in which a detailed display of each data discrepancy is shown (e.g., via an interactive GUI) along with tools that enable the resolution decision to be made. Additionally, setting the resolution may include receiving automated corrections based on common patterns or previous actions. In some examples, the automated suggestions may be improved via machine learning algorithms that learn from user corrections and decisions that enable the system to become more efficient and accurate over time. Additionally, setting the resolution decision may include recording the user's actions and resolution decisions for future consideration.

In some examples, S240 may support batch processing capabilities enabling users to apply corrections to multiple data discrepancies at once, which may speed up the review process. S240 may, additionally or alternatively, include mechanisms to validate user corrections before finalizing the resolution decision. It shall be noted that the term "user interactions" as used herein may refer to actions taken by users through a graphical or command-line interface, which directly influence the processing outcomes of data entries.

The functionality provided by S240 is crucial for the final verification and refinement of data entries in systems that rely on accurate and reliable data for operations or decision-making. By enabling user input to directly influence data statuses, this step ensures that the system remains responsive to new information and expert insights, ultimately enhancing the quality and utility of processed data.

Figure 5:
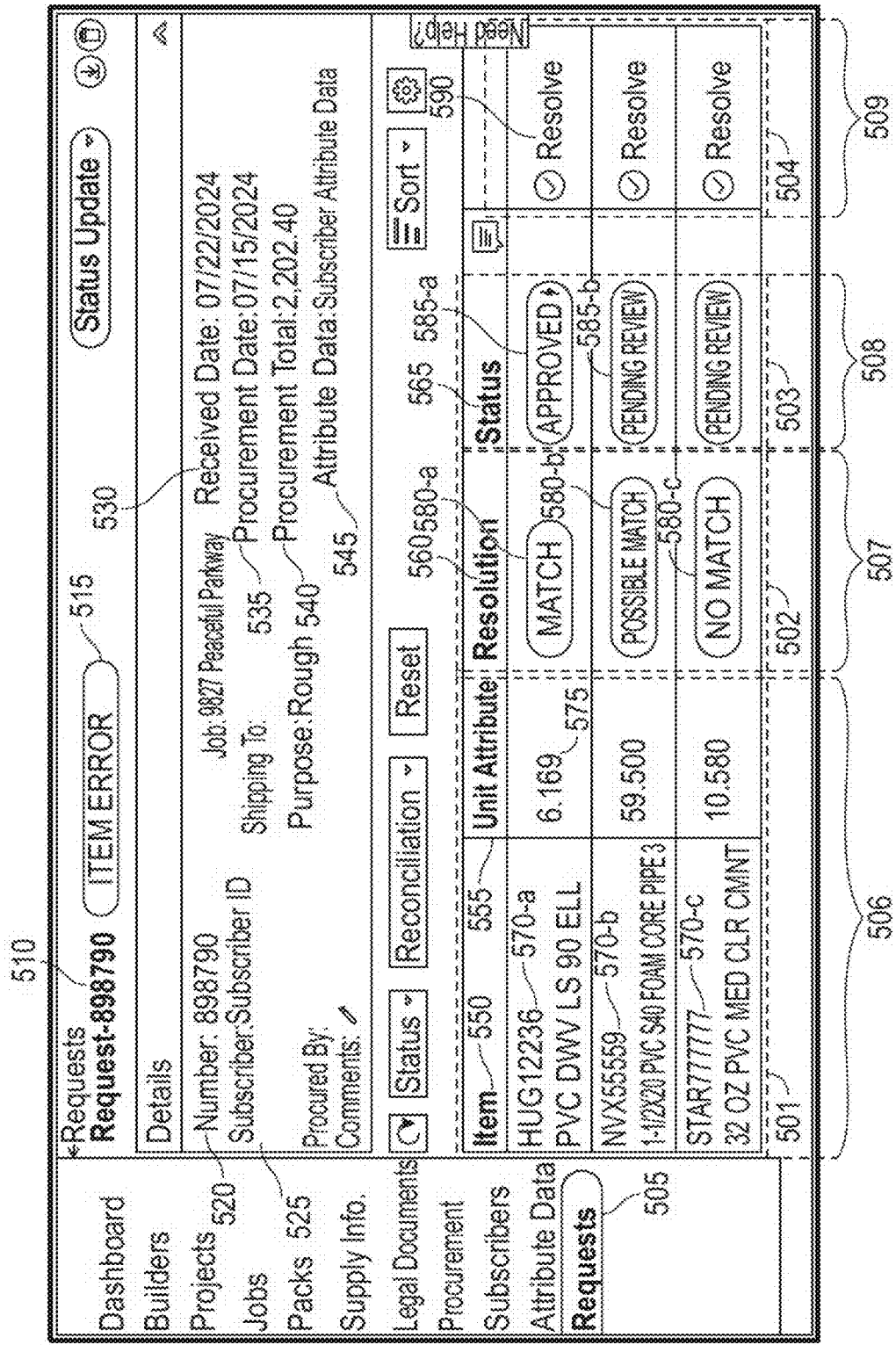

UI containers 500, 600, and 700 may illustrate non-limiting examples of systems for receiving user input to resolve data discrepancies (e.g., as related to S240). As depicted in FIG. 5, UI container 500 may correspond to a particular digital artifact 510 (e.g., a digital artifact displayed by UI container 400 of FIG. 4). Additionally, UI container 500 may display a review status 515 (e.g., the review status displayed in column 435 for a particular digital artifact). UI container 400 may be associated with a particular identifier 520 mapping to digital artifact, a particular entity 525 (e.g., a particular subscriber) linked to the digital artifact, a particular date 530 indicating when the digital artifact was first received, a particular date 535 indicating when a procurement of physical components associated with the digital artifact was first requested, a numerical attribute 540 indicating a total sum associated with a total quantity of physical components itemized in the digital artifact, a physical component resource data 545, or a combination thereof. In some examples, tab 505 may be used to pull up another UI container (e.g., UI container 400 as described herein). In some examples, UI container 500 may be a UI container of an interactive GUI.

UI container 500 may display a column 550 of physical component identifiers, a column 555 of unit attributes associated with a particular physical component identifier, a column 560 of match statuses associated with a particular physical component identifier, a column 565 of resolution decisions associated with a particular physical component identifier, and a column 509 of UI control elements 590 for triggering generation of another UI container (e.g., UI container 600 or 700). For instance, column 550 may include physical component identifier 570-a, which may be linked to unit attribute 575 of column 555, match status 580-a of column 560, resolution decision 585-a of column 565, and a UI control element 590 of column 509 (e.g., one of a set 504 of UI control elements 590 within column 509). In the present example, column 550 may include physical component identifier 570-a, physical component identifier 570-b, and physical component identifier 570-c. User input on the UI control element associated with physical component 570-b may trigger generation of UI container 600 of FIG. 6. User input on the UI control element associated with physical component 570-c may trigger generation of UI container 700 of FIG. 7.

In some examples, each match status of column 560 may indicate whether a match has occurred between a token associated with a particular physical component identifier and any token associated with a physical component resource data. The match status may display a full match indication 580-a (e.g., for physical component identifier 570-a), a potential match indication 580-b (e.g., for physical component identifier 570-b), or a no match indication 580-c (e.g., for physical component identifier 570-c). The potential match indication 580-b and/or no match indication 580-c may indicate a data discrepancy between a first token (e.g., first token 692 and/or 792) and a second token (e.g., second token 694 and/or second token 794).

In some examples, each resolution decision of column 565 of UI container 500 may indicate whether a set of UI control elements associated with the UI container generated by a respective UI control element 590 (e.g., set 697 of control elements of UI container 600 or set 797 of control elements of UI container 700) have received an input for resolving a data discrepancy and/or which of the set of UI control elements has received the input. The resolution decision may display a disposition comprising an approval indication 585-a (e.g., for physical component identifier 570-a), a pending review indication 585-b (e.g., for physical component identifiers 570-b and 570-c), a rejection (or block) indication, or an undefined status indication (e.g., an ignore indication).

In some examples, UI container 500 may include a first column 506 corresponding to a set 501 of first UI elements (e.g., first UI elements arranged along a first column), a second column 507 corresponding to a set 502 of second UI elements (e.g., second UI elements arranged along a second column), and a third column 508 corresponding to a set 503 of third UI elements (e.g., third UI elements arranged along a third column). Each of the set 501 of first UI elements may indicate a physical component identifier, a first physical component unit attribute, or both (e.g., for first token 692 and/or first token 792). Each of the set 502 of second UI elements may indicate whether a data discrepancy has occurred between an associated first and second token (e.g., between first token 692 and second token 694 and/or first token 792 and second token 794 as described herein). Each of the set 503 of third UI elements may indicate whether a set of UI control elements associated with the UI container generated by a respective UI control element 590 (e.g., set 697 of control elements of UI container 600 or set 797 of control elements of UI container 700) have received an input for resolving a data discrepancy and/or which of the set of UI control elements has received the input.

As depicted in FIG. 6, UI container 600 may correspond to a potential data discrepancy for a physical component associated with a digital artifact (e.g., the physical component associated with physical component identifier 570-b). UI container 600 may include a first UI element 601 arranged along a first column 606 of the UI container 600 based on a detection of first token 692. For instance, the first column 606 of first UI element 601 may include a first row with an indication 605 of the first token 692 as originating from digital artifact 691, a second row with an indication 625 of a data identifier 620 (e.g., a physical component identifier) associated with first token 692, a third row with an indication 645 of a unit attribute 640 associated with the first token 692, a fourth row with an indication 665 of a description 660 associated with first token 692, or a combination thereof. In some examples, UI container 600 may be a UI container of an interactive GUI.

Additionally, UI container 600 may include a second UI element 603 arranged along a second column 608 of the UI container 600 based on a detection of second token 694. For instance, the second column 608 of the UI container 600 may include a first row with an indication 610 of the second token 694 as originating from data structure 695, a second row with an indication 630 of a data identifier 620 (e.g., a physical component identifier) associated with second token 694, a third row with an indication 650 of a unit attribute 640 associated with the second token 694, a fourth row with an indication 665 of a description 670 associated with the second token 694, or a combination thereof.

Additionally, UI container 600 may include a third UI element 602 indicating a data discrepancy between first token 692 and second token 694. For instance, the third column may include a first row with an indication 615 of a degree of data discrepancy between the first token 692 and the second token 694, a second row with an indication 635 of whether the physical component identifier 620 associated with the first token 692 matches the physical component identifier 620 associated with the second token 694, (e.g., whether a data discrepancy is between them), a third row with an indication 655 of whether the unit attribute 640 associated with the first token 692 matches the unit attribute 640 associated with the second token 694 (e.g., whether a data discrepancy is between them), a fourth row with an indication 675 of whether the description 660 associated with the first token 692 matches the description 660 associated with the second token 694 (whether a data discrepancy is between them), or a combination thereof. In some examples, the third UI element 602 indicating the data discrepancy may be interposed between the first column 606 of the UI container 600 and the second column 608 of the UI container 600. Additionally, or alternatively, the third UI element 602 may indicate that the data discrepancy is ranged along a row in-line with and adjacent to either the first column 606 of the UI container 600 or the second column 608 of the UI container 600.

In some examples, the data discrepancy between first token 692 and second token 694 may be automatically computed based on identifying a first nonconformity of the data identifier 620 associated with first token 692 to the data identifier 620 associated with second token 694 or identifying a second nonconformity of the unit attribute associated with first token 692 to the unit attribute associated with second token 694. For instance, one or more first processors may detect that the first nonconformity is present between the data identifiers 620 and may transmit to one or more second processors that generate the GUI 600, a first signal indicating that the first nonconformity is present. The one or more second processors, upon receiving the signal, may generate a second signal to display an indication of the first nonconformity (e.g., via indication 635). Alternatively, the one or more first processors may transmit a first signal to the one or more second processors indicating the data identifiers 620 associated with first token 692 and second token 694. The one or more second processors may detect the first nonconformity is present and may generate a second signal to display an indication of the first nonconformity (e.g., via indication 635).

Additionally, or alternatively, one or more first processors may detect that the second nonconformity is present between the unit attributes 640 and may transmit to one or more second processors that generate the GUI 600, a first signal indicating that the second nonconformity is present. The one or more second processors, upon receiving the first signal, may generate a second signal to display an indication of the second nonconformity (e.g., via indication 655). Alternatively, the one or more first processors may transmit a first signal to the one or more second processors indicating the unit attributes 640 associated with first token 692 and second token 694. The one or more second processors may detect the second nonconformity is present and may generate a second signal to display an indication of the second nonconformity (e.g., via indication 655).

In the present example, a match may be detected between the data identifier 620 associated with the first token 692 and the data identifier 620 associated with the second token 694. The indication 635 may thus indicate a full match. Additionally, no match may be detected between the unit attribute 640 associated with the first token 692 and the unit attribute 640 associated with the second token 694. Thus, the indication 655 may indicate no match. Whether there is a match between the description 660 of first token 692 and the description 660 of second token 694 may not be considered. The indication 675 thus may indicate that no match was determined. The indication 615 may indicate 50 as the degree of data discrepancy, which may correspond to one full match and one data discrepancy (e.g., by dividing the total number of full matches by the total number of attributes for which a match was checked). It should be noted that the indication 615 may be determined by the first one or more processors that generate the GUI upon the one or more first processors identifying the data discrepancy between the data identifiers 620, unit attribute 640, or description 660. Alternatively, the indication 615 may be received via signaling from one or more second processors that perform the determination and may be converted into second signaling by the one or more first processors that is displayed as indication 615.

Additionally, UI container 600 may include a set 697 of UI control elements configured to receive one or more inputs for resolving the data discrepancy. Resolving the data discrepancy may include receiving inputs indicating whether a portion of the digital artifact corresponding to the first token 692 is invalid. The set 697 of UI control elements may include a first UI control element 680-*a* configured to indicate that the portion of the digital artifact corresponding to the first token 692 is valid (e.g., that the discrepancy between the first token 692 and the second token 694 is being approved), a second UI control element 680-*b* configured to indicate that the portion of the digital artifact corresponding to the second first token 692 is invalid (e.g., that the discrepancy between the first token 692 and the second token 694 is being rejected), and a third UI control element 680-*c* configured to indicate that the portion of the digital artifact corresponding to the first token 692 has an undefined status (e.g., that the discrepancy between the first token 692 and the second token 694 is being ignored).

In some examples, in response to the third UI element 602 indicating the data discrepancy between the first token 692 and the second token 694, the GUI 600 may support reception of an input that adapts the data identifier 620 associated with the first token 692 or the data identifier associated with the second token 694. Accordingly, a state of the third UI element 602 may be automatically changed from indicating the data discrepancy to indicating a data validity between first token 692 and second token 694. For instance, a user may provide input to at least a portion of the first UI element 601 (e.g., the portion including indication 625 and/or indication 605) and may select a different data identifier associated with digital artifact 691. Alternatively, the user may provide input to at least a portion of the second UI element 603 (e.g., the portion including indication 630 and/or 610) and may select a different data identifier associated data structure 695 (e.g., a data identifier associated with a different token of the set of tokens 696). Providing the input may generate a request signal that is provided by one or more first processors that generated GUI 600 to one or more second processors that may be capable of accessing digital artifact 691 or data structure 695. The one or more second processors may transmit a signal that indicates one or more tokens that the user may select corresponding to different data identifiers.

Upon selecting the different data identifier 620, the third UI element 607 may be refreshed or regenerated according to the different data identifier 620. For instance, if a unit attribute 640 associated with a newly selected data identifier 620 for second UI element 608 matches the unit attribute 640 associated with the original data identifier 620 for first UI element 606, the indication 655 may be updated to display a match. The indication 615 may likewise be updated. In some examples, a request including the digital artifact 691 may be automatically processed to a completed state based on a change of the state of the third UI element 602, thereby successfully disposing of the request (e.g., if the unit attributes match within a predefined range).

UI container 600 may additionally include a UI control element 685 which may be configured to dismiss UI container 600 and/or to pull up UI container 500. Additionally, UI container 600 may include a UI control element configured to navigate to a next UI container for another physical component of the digital artifact upon a resolution decision being made.

As depicted in FIG. 7, UI container 700 may correspond to no match for a physical component associated with a digital artifact (e.g., the physical component associated with physical component identifier 570-c). UI container 700 may include a first UI element 701 arranged along a first column 706 of the UI container 700 based on a detection of first token 792. For instance, the first column 706 of first UI element 701 may include a first row with an indication 705 of the first token 792 as originating from digital artifact 791, a second row with an indication 725 of a data identifier 720 (e.g., a physical component identifier) associated with first token 792, a third row with an indication 745 of a unit attribute 740 associated with the first token 792, a fourth row with an indication 765 of a description 760 associated with first token 792, or a combination thereof. In some examples, UI container 700 may be a UI container of an interactive GUI.

Additionally, UI container 700 may include a second UI element 703 arranged along a second column 708 of the UI container 700 based on a detection of a second token 794. For instance, the second column 708 of the UI container 700 may include a first row with an indication 710 of the second token 794 as originating from data structure 795, a second row with an indication 730 of a data identifier 720 (e.g., a physical component identifier) associated with second token 794, a third row with an indication 750 of a unit attribute 740 associated with the second token 794, a fourth row with an indication 765 of a description 770 associated with the second token 794, or a combination thereof.

Additionally, UI container 700 may include a third UI element 702 indicating a data discrepancy between first token 792 and second token 794. For instance, the third column may include a first row with an indication 715 of a degree of data discrepancy between the first token 792 and the second token 794, a second row with an indication 735 of whether the physical component identifier 720 associated with the first token 792 matches the physical component identifier 720 associated with the second token 794, (e.g., whether a data discrepancy is between them), a third row with an indication 755 of whether the unit attribute 740 associated with the first token 792 matches the unit attribute 640 associated with the second token 794 (e.g., whether a data discrepancy is between them), a fourth row with an indication 775 of whether the description 760 associated with the first token 792 matches the description 760 associated with the second token 794 (whether a data discrepancy is between them), or a combination thereof. In some examples, the third column 707 may be between the first column 706 and the second column 708. In some examples, the third UI element 702 indicating the data discrepancy may be interposed between the first column 706 of the UI container 700 and the second column 708 of the UI container 700. Additionally, or alternatively, the third UI element 702 may indicate that the data discrepancy is ranged along a row in-line with and adjacent to either the first column 706 of the UI container 700 or the second column 708 of the UI container 700.

In some examples, the data discrepancy between first token 792 and second token 794 may be automatically computed based on identifying a first nonconformity of the data identifier 720 associated with first token 792 to the data identifier 720 associated with second token 794 or identifying a second nonconformity of the unit attribute associated with first token 792 to the unit attribute associated with second token 794. For instance, one or more first processors may detect that the first nonconformity is present between the data identifiers 720 and may transmit to one or more second processors that generate the GUI 700, a first signal indicating that the first nonconformity is present. The one or more second processors, upon receiving the signal, may generate a second signal to display an indication of the first nonconformity (e.g., via indication 735). Alternatively, the one or more first processors may transmit a first signal to the one or more second processors indicating the data identifiers 720 associated with first token 792 and second token 794. The one or more second processors may detect the first nonconformity is present and may generate a second signal to display an indication of the first nonconformity (e.g., via indication 735).

Additionally, or alternatively, one or more first processors may detect that the second nonconformity is present between the unit attributes 740 and may transmit to one or more second processors that generate the GUI 700, a first signal indicating that the second nonconformity is present. The one or more second processors, upon receiving the first signal, may generate a second signal to display an indication of the second nonconformity (e.g., via indication 755). Alternatively, the one or more first processors may transmit a first signal to the one or more second processors indicating the unit attributes 740 associated with first token 792 and second token 794. The one or more second processors may detect the second nonconformity is present and may generate a second signal to display an indication of the second nonconformity (e.g., via indication 755).

In the present example, no token that fully or partially matches first token 792 may be detected (e.g., second token 794 may be a token whose attributes do not match any attributes of first token 792). Accordingly, no match may be detected between the physical component identifier 720 associated with first token 792 and the physical component identifier 720 of the second token 794. Likewise, no match may be detected between the unit attribute 740 associated with first token 792 and the unit attribute 740 associated with second token 794. Whether there is a match between description 760 of first token 792 and description 760 of second token 794 may not be considered. The indication 775 may thus indicate that no match was determined. The indication 715 may indicate 0 or no match as the degree of data discrepancy, which may correspond to no full matches and two data discrepancies (e.g., by dividing the total number of full matches by the total number of attributes for which a match was checked). It should be noted that the indication 715 may be determined by the first one or more processors that generate the GUI upon the one or more first processors identifying the data discrepancy between the data identifiers 720, unit attribute 740, or description 760. Alternatively, the indication 715 may be received via signaling from one or more second processors that perform the determination and may be converted into second signaling by the one or more first that is displayed as indication 715.

Additionally, UI container 700 may include a set 797 of UI control elements configured to receive one or more inputs for resolving the data discrepancy. Resolving the data discrepancy may include receiving inputs indicating whether a portion of the digital artifact corresponding to the first token 792 is invalid. The set 797 of UI control elements may include a first UI control element 780-*a* configured to indicate that the portion of the digital artifact corresponding to the first token 792 is valid (e.g., that the discrepancy between the first token 792 and the second token 794 is being approved), a second UI control element 780-*b* configured to indicate that the portion of the digital artifact corresponding to the second first token 792 is invalid (e.g., that the discrepancy between the first token 792 and the second token 794 is being rejected), and a third UI control element 780-*c* configured to indicate that the portion of the digital artifact corresponding to the first token 792 has an undefined status (e.g., that the discrepancy between the first token 792 and the second token 794 is being ignored).

In some examples, in response to the third UI element 702 indicating the data discrepancy between the first token 792 and the second token 794, the GUI 600 may support reception of an input that adapts the data identifier 720 associated with the first token 792 or the data identifier associated with the second token 794. Accordingly, a state of the third UI element 702 may be automatically changed from indicating the data discrepancy to indicating a data validity between first token 792 and second token 794. For instance, a user may provide input to at least a portion of the first UI element 701 (e.g., the portion including indication 725 and/or indication 705) and may select a different data identifier associated with digital artifact 791. Alternatively, the user may provide input to at least a portion of the second UI element 703 (e.g., the portion including indication 730 and/or 710) and may select a different data identifier associated data structure 795 (e.g., a data identifier associated with a different token of the set of tokens 796). Providing the input may generate a request signal that is provided by one or more first processors that generated GUI 700 to one or more second processors that may be capable of accessing digital artifact 791 or data structure 795. The one or more second processors may transmit a signal that indicates one or more tokens that the user may select corresponding to different data identifiers.

Upon selecting the different data identifier 720, the third UI element 707 may be refreshed or regenerated according to the different data identifier 720. For instance, if a unit attribute 740 associated with a newly selected data identifier 720 for second UI element 708 matches the unit attribute 740 associated with the original data identifier 720 for first UI element 706, the indication 755 may be updated to display a match. The indication 715 may likewise be updated. In some examples, a request including the digital artifact 791 may be automatically processed to a completed state based on a change of the state of the third UI element 702, thereby successfully disposing of the request (e.g., if the unit attributes match within a predefined range).

UI container 700 may additionally include a UI control element 785 which may be configured to dismiss UI container 700 and/or to pull up UI container 500. Additionally, UI container 700 may include a UI control element 790 configured to navigate to a next UI container for another physical component of the digital artifact upon a resolution decision being made.

In some examples, displaying the third UI element (e.g., UI element 603 and/or UI element 703) may include storing, in memory associated with the GUI, information about the data discrepancy between the first token (e.g., first token 692, first token 792) and the second token (e.g., second token 794, second token 794), generating a digital signal based on information about the data discrepancy stored in memory, and converting the digital signal into third UI element. Additionally, or alternatively, displaying the first UI element (e.g., UI element 601 and/or UI element 701) may include storing, in memory associated with the GUI, information about the first token, generating a digital signal based on the information about the first token, and converting the digital signal into the first UI element. Additionally, or alternatively, displaying the second UI element (e.g., UI element 602 and/or UI element 702) may include storing, in memory associated with the GUI, information about the second token, generating a digital signal based on the information about the second token, and converting the digital signal into the second UI element.

In some examples, the resolution decision may be made automatically (e.g., without user input). Making the resolution decision as described with reference to step S240 may correspond to manually making the resolution decision. In some examples, the resolution decision may be made automatically if a full match occurs (e.g., auto-approval of physical components associated with the digital artifact 691 and/or 791 or auto-acceptance of digital artifacts)

2.45 Transmitting an Indication of the Resolution Decision

S245, which includes transmitting an indication of the resolution decision to an external source, functions to communicate resolution decisions to external systems. S245 may be performed by a transmission module operating on the computer processor. The transmission module may utilize one or more communication protocols, interfaces (e.g., APIs, direct database links) to transmit the indication securely. In some examples, the resolution decision may be included with a copy of the digital artifact (e.g., sent as a PDF).

In some examples, performing the transmitting may include data formatting, which may include converting data into formats utilized by external systems before transmission, ensuring compatibility and proper integration. Additionally, performing the transmitting may include performing secure transmission, such as employing encryption and secure transmission techniques to safeguard the resolution decision information during transfer from interception and unauthorized access.

In some examples, S245 may include error handling mechanisms to manage issues that occur during data transmission, such as connectivity problems or data format data discrepancies. These mechanisms can attempt retries, log transmission errors for further investigation, or alert system administrators to critical issues. Furthermore, S245 may support feedback mechanisms where the receiving external systems can send back confirmation of data receipt or details of any issues encountered during data integration. This feedback can be crucial for maintaining data coherence and continuity across interconnected systems.

It shall be noted that the term "external systems" as used herein may refer to any independent software systems or platforms that interact with or depend on data from the internal data processing system. These systems may use the data for a variety of purposes, including further processing, analysis, storage, or presentation.

The functionality provided by S245 may extend the utility of processed data beyond the confines of the originating system. By ensuring that data can be effectively communicated to and integrated with external systems, this step supports broader data utilization and maximizes the impact of data-driven processes.

UI containers 600 and 700 may illustrate non-limiting examples of a system that enables transmission of an indication of the resolution decision (e.g., as related to S245).

For instance, the set 697 of UI control elements may be configured to initiate, upon receiving user input and over a computer network, an automatic transmission of an indication of which of the set 697 of UI control elements received an input. Similarly, the set 797 of UI control elements may be configured to initiate, upon receiving user input and over a computer network, an automatic transmission of an indication of which of the set 697 of UI control elements received an input. In some examples, the set of UI control elements may provide (e.g., upon receiving user input) an indication of whether a portion of a digital artifact corresponding to a first token (e.g., first token 692 and/or first token 792) is invalid, may store, in memory associated with the GUI, information about the indication, and may transmit, over a computer network, a message based on the stored information about the indication.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-program product embodied in a non-transitory machine-readable storage medium storing computer instructions that, when executed by one or more processors, perform operations that provide an interactive graphical user interface (GUI) comprising a user interface (UI) container, the UI container including:
   a first UI element arranged along a first column of the UI container based on a detection of a first token of a digital artifact, wherein the first token indicates first identifier data associated with a first physical component and a first unit attribute associated with the first physical component;
   a second UI element arranged along a second column of the UI container based on an identification of a second token of a plurality of distinct tokens within a persistently accessible data structure, wherein the second token indicates second identifier data associated with a second physical component and a second unit attribute associated with the second physical component;
   a third UI element indicating a data discrepancy between the first token and the second token, wherein the data discrepancy is automatically computed based on:
      identifying a first nonconformity of the first identifier to the second identifier, or
      identifying a second nonconformity of the first unit attribute to the second unit attribute; and
   a set of UI control elements configured to receive one or more inputs for resolving the data discrepancy, wherein resolving the data discrepancy comprises receiving inputs indicating whether a portion of the digital artifact corresponding to the first token is invalid;
   wherein the GUI further comprises a second UI container, and wherein the second UI container includes:
      a first UI element arranged along a first column of the second UI container and indicating the data discrepancy between the first and the second token; and
      a UI control element arranged along a second column of the second UI container and configured to trigger generation of the UI container upon receiving an input.

2. The computer-program product of claim 1, wherein the second UI container further includes:
   a second UI element arranged along a third column of the second UI container and indicating whether the set of UI control elements of the UI container have received an input for resolving the data discrepancy.

3. The computer-program product of claim 2, wherein the second UI element of the second UI indicates that the set of UI control elements of the UI container have received the input for resolving the data discrepancy and further indicates which of the set of UI control elements received the input.

4. The computer-program product of claim 1, wherein the UI container further includes:
   a second UI element arranged along a third column of the second UI container and indicating the first physical component identifier, first physical component unit attribute, or both.

5. The computer-program product of claim 1, wherein the second UI container includes:
   a UI control element configured to obtain the digital artifact upon receiving an input, wherein the UI control element is further configured to automatically initiate generation of the first token based on obtaining the digital artifact.

6. The computer-program product of claim 1, wherein the second UI container includes:
   a UI control element configured to obtain a second digital artifact upon receiving an input, wherein the UI control element is further configured to automatically initiate generation of the persistently accessed data structure based on obtaining the second digital artifact.

7. The computer-program product of claim 1, wherein within the UI container:
   the third UI element indicating the data discrepancy is interposed between the first column of the UI container and the second column of the UI container, or
   the third UI element indicating the data discrepancy is arranged along a row in-line with and adjacent to either the first column of the UI container or the second column of the UI container.

8. The computer-program product of claim 1, wherein the set of UI control elements includes a first UI control element configured to indicate that the portion of the digital artifact corresponding to the first token is valid, a second UI control element configured to indicate that the portion of the digital artifact corresponding to the first token is invalid, and a third UI control element configured to indicate that the portion of the digital artifact corresponding to the first token has an undefined status.

9. A method implementing a graphical user interface (GUI), the method comprising:
 providing, via the GUI, a user interface (UI) container, the UI container comprising:
  a first UI element arranged along a first column of the UI container based on a detection of a first token of a digital artifact, and wherein the first token indicates first identifier data associated with a first physical component and a first unit attribute associated with the first physical component;
  a second UI element arranged along a second column of the UI container based on an identification of a second token of a plurality of distinct tokens within a persistently accessible data structure, wherein the second token indicates second identifier data associated with a second physical component and a second unit attribute associated with the second physical component;
  a third UI element indicating a data discrepancy between the first token and the second token, wherein the data discrepancy is automatically computed based on:
   identifying a first nonconformity of the first identifier to the second identifier, or
   identifying a second nonconformity of the first unit attribute to the second unit attribute; and
  a set of UI control elements configured to receive one or more inputs for resolving the data discrepancy, wherein resolving the data discrepancy comprises receiving inputs indicating whether a portion of the digital artifact corresponding to the first token is invalid;
 wherein the GUI further comprises a second UI container, and wherein the second UI container includes:
  a first UI element arranged along a first column of the second UI container and indicating the data discrepancy between the first and the second token; and
  a UI control element arranged along a second column of the second UI container and configured to trigger generation of the UI container upon receiving an input.

10. The method of claim 9, wherein the second UI container further includes:
 a second UI element arranged along a third column of the second UI container and indicating whether the set of UI control elements of the UI container have received an input for resolving the data discrepancy.

11. A computer-implemented method for implementing a graphical user interface (GUI) comprising a user interface (UI) container, the computer-implemented method comprising:
 providing, within the UI container, a first UI element arranged along a first column of the UI container based on detection a first token, wherein the first token indicates first identifier data associated with a first physical component and a first unit attribute associated with the first physical component;
 providing, within the UI container, a second UI element arranged along a second column of the UI container based on a detection of a second token of a plurality of distinct tokens within a persistently accessible data structure, wherein the second token indicates second identifier data associated with a second physical component and a second unit attribute associated with the second physical component;
 providing, within the UI container, a third UI element indicating a data discrepancy between the first token and the second token, wherein the data discrepancy is automatically computed based on:
  identifying a first nonconformity of the first identifier to the second identifier, or
  identifying a second nonconformity of the first unit attribute to the second unit attribute; and
 providing, within a second UI container, a set of UI control elements configured to receive one or more inputs for resolving the data discrepancy, wherein resolving the data discrepancy comprises receiving inputs indicating whether a portion of the digital artifact corresponding to the first token is invalid;
 in response to the third UI element indicating the data discrepancy between the first token and the second token, receiving an input via the interactive GUI that adapts either the first identifier or the second identifier; and
 automatically changing a state of the third UI element from indicating the data discrepancy to indicating a data validity between the first token and the second token.

12. The computer-implemented method of claim 11, further comprising:
 automatically processing a request comprising the digital artifact to a completed state based on the change of the state of the third UI element thereby successfully disposing the request.

13. The computer-implemented method of claim 11, wherein providing the third UI element comprises:
 storing, in memory associated with the GUI, information about the data discrepancy between the first token and the second token;
 generating a digital signal based at least in part on the information about the data discrepancy stored in memory; and
 converting the digital signal into the third UI element.

14. The computer-implemented method of claim 11, wherein providing the first UI element comprises:
 storing, in memory associated with the GUI, information about the first token;
 generating a digital signal based at least in part on the information about the first token; and
 converting the digital signal into the first UI element.

15. The computer-implemented method of claim 11, wherein providing the second UI element comprises:
 storing, in memory associated with the GUI, information about the second token;
 generating a digital signal based at least in part on the information about the second token; and
 converting the digital signal into the second UI element.

16. The computer-implemented method of claim 11, further comprising:
 receiving, via the set of UI control elements, an indication of whether the portion of the digital artifact corresponding to the first token is invalid;
 storing, in memory associated with the GUI, information about the indication; and
 transmitting, over a computer network, a message based on the stored information about the indication.

* * * * *